March 24, 1959

M. INGRAM 2,879,495

SPRING SEPARABLE CONNECTOR

Filed Dec. 4, 1953

INVENTOR
Maxwell Ingram
BY
A.H. Golden
ATTORNEY

United States Patent Office 2,879,495
Patented Mar. 24, 1959

2,879,495
SPRING SEPARABLE CONNECTOR

Maxwell Ingram, Dumont, N.J., assignor to Gorn Electric Co., Inc., Stamford, Conn., a corporation of Connecticut Application December 4, 1953, Serial No. 396,126

5 Claims. (Cl. 339—45)

This invention relates to an electrical connector of the type in which a multiple number of contact pins carried by one connector body are adapted to enter a multiple number of contact sockets carried by the other connector body. Because the connector bodies are quite small, and because the sockets and pins are quite small, and because there is a considerable number of pins and sockets, once the pins and sockets are joined, it is very difficult to separate them.

In order to facilitate the separation of the contact pins from the contact sockets, ejector means of various types have been developed by the prior art. One popular type of ejector is in the form of a sleeve carried by each contact pin. The sleeve is spring pressed outwardly relatively to the bore in which the contact pin is mounted and is adapted to engage the socket in which the pin enters. In order to limit the outward movement of the sleeve relatively to the pin, the sleeve has a bore substantially larger than the pin for at least part of its length and a small washer or spring ring operates in a groove of the pin and against a shoulder in the sleeve for limiting the movement of the sleeve relatively to the pin in an outward direction.

This means that there is a considerable space between the pin and the internal diameter of the sleeve, making possible the movement of dirt into the space to prevent the proper functioning of the pin and its proper entry into the socket contact of the other part of the connector. In addition, the sleeve must be made somewhat longer than desirable in order to give some bearing of the sleeve relatively to the pin, since otherwise the sleeve will bear only in the bore in which the pin is mounted. Even with this extra length of the sleeve, the greater part of the bearing mounting for the sleeve is in the bore of the connector body, a feature that is not at all desirable, as it develops considerable friction, especially should the sleeve teeter or cock somewhat relatively to the pin.

Moreover, the washer or clip that must be mounted in a groove of the pin for limiting the outward movement of the sleeve is exceedingly small, and therefore not very reliable or effective, while quite difficult to apply. Because the pin itself must be quite small, the forming of a groove for the washer or clip weakens the pin rather considerably.

The invention that I have conceived is exceedingly novel and obviates the several defects of the prior art that I have discussed. Thus, I utilize a sleeve that fits very closely about the pin at all times for the full length of the sleeve if desired, preventing the entry of dirt between the sleeve and the pin. Because of this construction, I do not depend for the guidance of the sleeve on means other than the pin itself, and the bore in the connecting body does not function as a guide nor hinder in any way the smooth sliding of the sleeve relatively to its pin, as is necessary for effective ejector operation of the sleeve. Moreover, there cannot be a cocking of the sleeve relatively to the connector body and the pin because of the very considerable bearing of the sleeve on the pin.

As a further feature of my invention, the spring that presses the sleeve endwise and outwardly relatively to the pin is secured at one end to the pin and at its other and limits the sleeve movement to a predetermined position prevent movement of the sleeve off the end of the pin and limits the sleeve movement to a predetermined position relatively to the pin. This makes possible the use of a relatively strong and effective spring because the spring at one end abuts the sleeve rather than a bearing extension of the sleeve. It makes possible the use further of a shorter sleeve and a longer spring where a longer spring is desirable. It is obvious that the contact pin need no longer be grooved for a limiting clip or washer, and that the entire resulting combination is extremely effective in operation and construction.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings.

Figure 1:
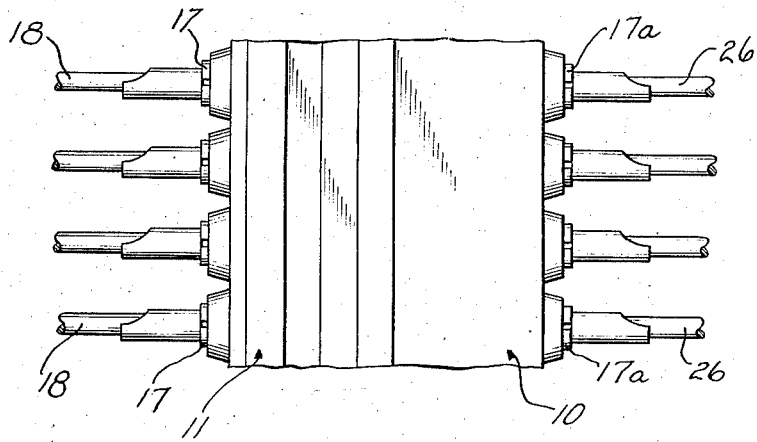
Fig. 1 is an elevation of part of a connector embodying my invention.
Figure 2:
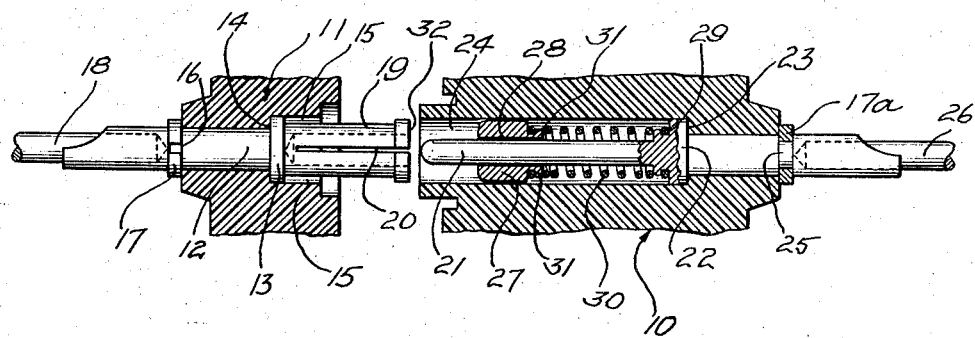
Fig. 2 is a section through part of Fig. 1, showing my contribution to the art.

Referring now more particularly to the drawings, the parts of the invention illustrated in Figure 1 are quite usual and well known in the art, insofar as they may be seen in Fig. 1. In Fig. 2 the ejector construction of my invention is fully and clearly set forth.

Thus, reference numeral 10 indicates one connector body, while the other connector body is designated by reference numeral 11, the two connector bodies being adapted for movement into the juxtaposed relation well shown in Fig. 1. The contact socket of my invention is mounted in the connector body 11 and comprises a central portion 12 formed with a flange 13 lying against a shoulder 14 at one end of a bore 15 of the connector body. The part 12 is grooved at 16 for a clip or fastening ring 17, it being obvious that between the clip 17 and the flange 13 the connector socket is maintained securely against endwise movement relatively to the connector body. A wire 18 is soldered to the socket connector as illustrated, in a manner conventional in this art.

The connector socket is equipped with a socket portion 19 having a central bore therethrough and slots 20 adapted to permit yielding of the socket as a pin is inserted into its bore.

The connector pin of my invention is assembled relatively to the connector body 10, as is well illustrated in Fig. 2. Thus, the connector pin has a contact pin portion 21 that is adapted to enter the bore in the connector socket. At one end of the pin portion is formed a shoulder 22 that lies against the shouldered end 23 of the bore 24 in which the pin portion 21 is contained. A clip 17a similar to clip 17 operates in a groove 25 of the pin contact, and it is obvious now that the shoulder 23 coacting with the clip 17a will prevent endwise movement of the pin contact relatively to the connector body 10. A wire 26 is soldered or otherwise secured to the pin contact in a conventional manner similar to the wire 18.

The ejector sleeve of my invention is designated by reference numeral 27 and is formed with a bore 28 whereby to slide freely on the pin 21. The sleeve bore 28 is of sufficient length so that, as is quite obvious, a good sliding bearing is presented between the ejector sleeve 27 and the pin 21. Of course, the ejector sleeve 27 is of such size as to slide easily relatively to the bore 24 in the connector body 10.

The pin 21, at the shoulder 23, is formed with a retaining groove 29 into which fits one end of an ejector spring 30 to be secured to pin 21. One end of the sleeve 27 is similarly formed with a retaining groove 31, and the other end of the ejector spring 30 fits into this retainer groove to be secured to the ejector sleeve. Spring 30 lies about the pin 21, and obviously, because its ends are between the shoulder 23 and the ejector sleeve 27, presses the ejector sleeve to the position shown in Fig. 2. It is obvious, further, that the spring 30, because its ends are secured through means of the retaining grooves to the pin and the ejector sleeve, will prevent the outward movement of the ejector sleeve off the end of the pin 21.

Because of the construction of the parts, it is obvious that when the connector bodies 10, 11 are brought together to the position of Fig. 1, pin 21 will enter the bore of the socket contact while the end of the ejector sleeve 27 will abut the end 32 of the contact socket. The spring 30 will be compressed, thereby tending always to press the contact socket and its body 11 away from engagement with the pin 21 and the contact body 10. Therefore, with an ejector sleeve 27 and spring 30 about each pin in the connector body 10, there will be a constant force tending to separate the bodies 10, 11, which will be available when such separation is required.

Those skilled in the art, after a full review of the description herein set forth of my invention, together with an analysis of the prior art and its difficulties, will now appreciate the very considerable contribution I have made to this art.

I now claim:

1. In a spring separating connector, a connector body having a bore, a pin in said bore having a portion adapted for entering a socket contact, an ejector sleeve having an inside bore in bearing relation to said pin for substantially the full length of said sleeve whereby said sleeve is slidable on said pin, the outer periphery of said sleeve being in sliding bearing relation to the bore of said connector body, a compression spring about said pin, means securing the coil at one end of said spring to said pin, and means whereby the coil at the other end of said spring is fastened about a groove in said sleeve to hold said sleeve yieldingly against movement relatively to said pin in either of opposed directions.

2. In a spring separating connector, a connector body having a compound bore with one part of its length of smaller diameter than the remainder thereof, a pin in said bore having a shoulder fitting against the shoulder in said bore where said small diameter part begins, the pin portion in the part of said bore of larger diameter being adapted to enter a socket contact, an ejector sleeve having an inside bore of a diameter such that its inner surface is in bearing relation to said pin for substantially the full length of said sleeve whereby said sleeve is slidable on said pin, the outer periphery of said sleeve being in sliding bearing relation to the bore of said connector body, a compression spring about said pin, means securing one end of said spring to said pin, and means whereby the coil at the other end of said spring is fastened to said sleeve to hold said sleeve yieldingly against movement relatively to said pin in either of opposed directions.

3. A spring separating connector contact comprising a pin having a contact end adapted to enter a socket, an ejector sleeve having an inside bore so dimensioned that substantially the full length of the sleeve inner surface is in bearing relation to said pin whereby said sleeve is effectively mounted for sliding movement on said pin, a spring about said pin and positioned between one end of the sleeve and the end of said pin opposite said contact end, means securing one end of said spring to said pin, and means whereby the other end of said spring is fastened to said sleeve to hold said sleeve yieldingly against movement off the contact end of said pin in one direction and against movement yieldingly in a reverse direction.

4. A spring separating connector contact comprising a pin, an ejector sleeve having an inside bore so dimentioned that said sleeve is effectively mounted for sliding movement on said pin, a spring about said pin and positioned with one end at the sleeve, the coil at one end of said spring fitting in a groove in said pin to secure one end of the spring to said pin, and the coil at the other end of said spring being secured to a groove in said sleeve to hold said sleeve yieldingly against movement off said pin.

5. A spring separating connector contact comprising a pin, an ejector sleeve having an inside bore so dimensioned at each end of said sleeve that both ends of the inner surface of the sleeve are in bearing relation to said pin whereby said sleeve is effectively mounted for sliding movement on said pin, a spring about said pin and positioned between one end of the sleeve and one end of said pin, the coil of one end of said spring fitting in a groove of said pin, and means whereby the coil at the other end of said spring is secured in a groove of said sleeve.

References Cited in the file of this patent

UNITED STATES PATENTS

| 2,466,370 | Burtt | Apr. 5, 1949 |
| 2,532,538 | Burtt et al. | Dec. 5, 1950 |
| 2,658,182 | Jackson | Nov. 3, 1953 |
| 2,736,870 | De Jur | Feb. 28, 1956 |

FOREIGN PATENTS

| 451,305 | Germany | Oct. 19, 1927 |